United States Patent [19] [11] 3,888,293
Laforet et al. [45] June 10, 1975

[54] METHOD OF MAKING A FOUNDRY CORE

[75] Inventors: Henry A. Laforet; Michael J. Zusack, both of Sarnia, Ontario, Canada

[73] Assignee: American Motors Corporation, Detroit, Mich.

[22] Filed: Apr. 20, 1973

[21] Appl. No.: 353,176

[52] U.S. Cl. .............................................. 164/16
[51] Int. Cl. .......................................... B22c 9/12
[58] Field of Search....................... 164/12, 16, 43

[56] References Cited
UNITED STATES PATENTS

| | | | |
|---|---|---|---|
| 3,008,205 | 11/1961 | Blaies................................ | 164/16 |
| 3,409,579 | 11/1968 | Robins............................... | 164/16 UX |
| 3,428,110 | 2/1969 | Walker et al..................... | 164/16 X |
| 3,590,902 | 7/1971 | Walker et al..................... | 164/43 |
| 3,795,726 | 3/1974 | Zifferer et al.................... | 164/16 X |

*Primary Examiner*—Francis S. Husar
*Assistant Examiner*—John E. Roethel
*Attorney, Agent, or Firm*—Reising, Ethington & Perry

[57] ABSTRACT

A process and apparatus for high speed production of foundry cores exhibiting high strength, dimensional accuracy and an excellent surface finish. The process is carried out by a preferred apparatus which comprises: means for mixing a foundry aggregate with a curable binder; enclosed mold means, including vent means, for shaping said mixture to form a green body; and means for sequentially introducing a first pressurized gas including a curing agent and a second pressurized gas, preferably dried air, into said enclosed mold through a manifolding system carried on a gassing plate adapted to engage the enclosed mold means in sealed relationship, wherein said venting means is adapted to cause a back pressure upon introduction of said first and second pressurized gasses into said enclosed mold, thus causing said gasses, including the curing agent, to be driven throughout said enclosed mold and thereby equalizing the pressure from said gasses throughout the body formed therein. In the preferred process the first pressurized gas is introduced in two stages, the first stage gas being introduced at substantially lower pressure than the second stage gas. In addition, a third pressurized gas which will serve to neutralize any residual odor from the curing agent may be introduced subsequent to the second pressurized gas. The application also discloses a novel electrical circuit for controlling the sequential introduction of said first and second pressurized gasses as well as a method for converting conventional hot-box core making equipment to an apparatus for carrying out the process of the subject invention.

37 Claims, 11 Drawing Figures

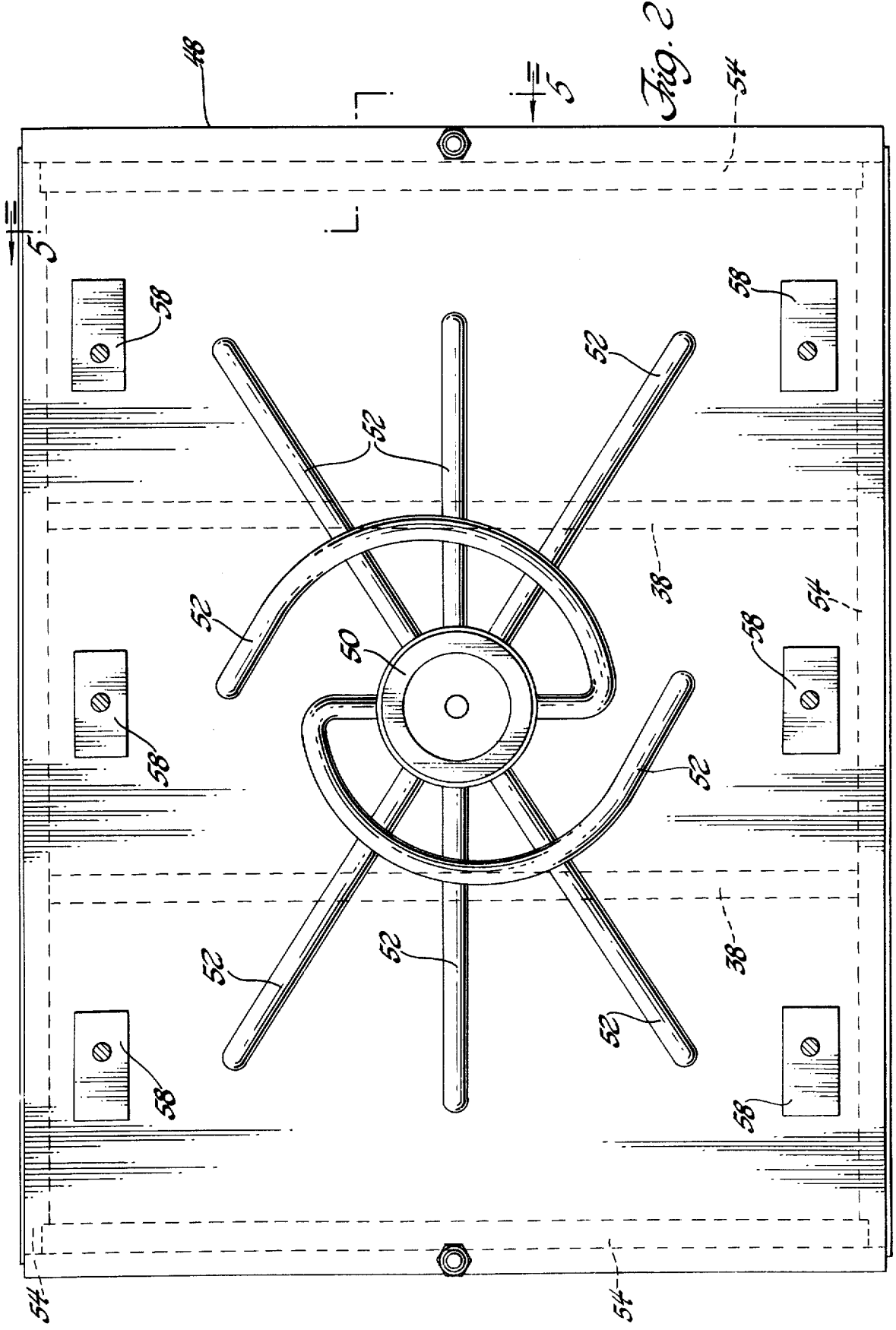

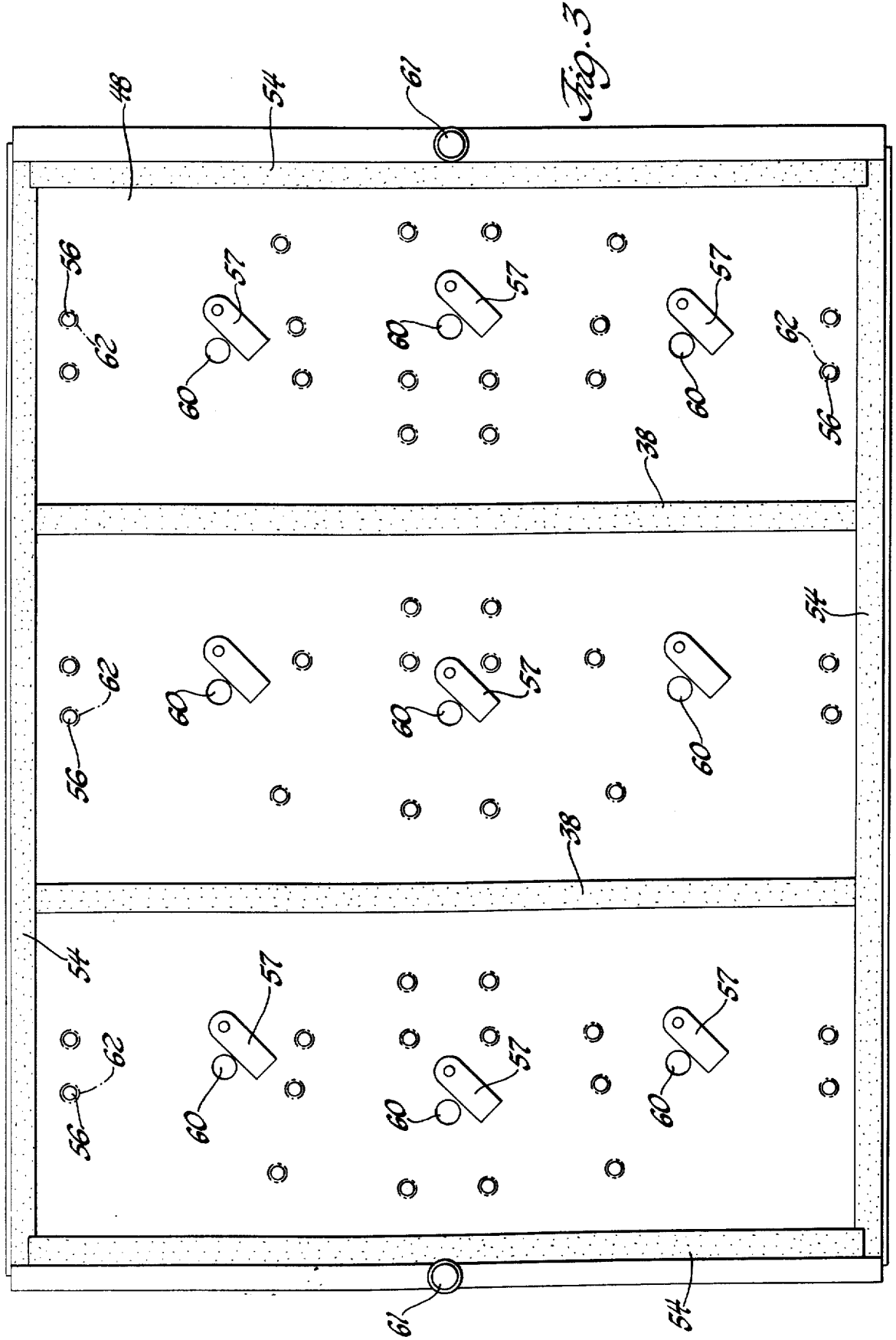

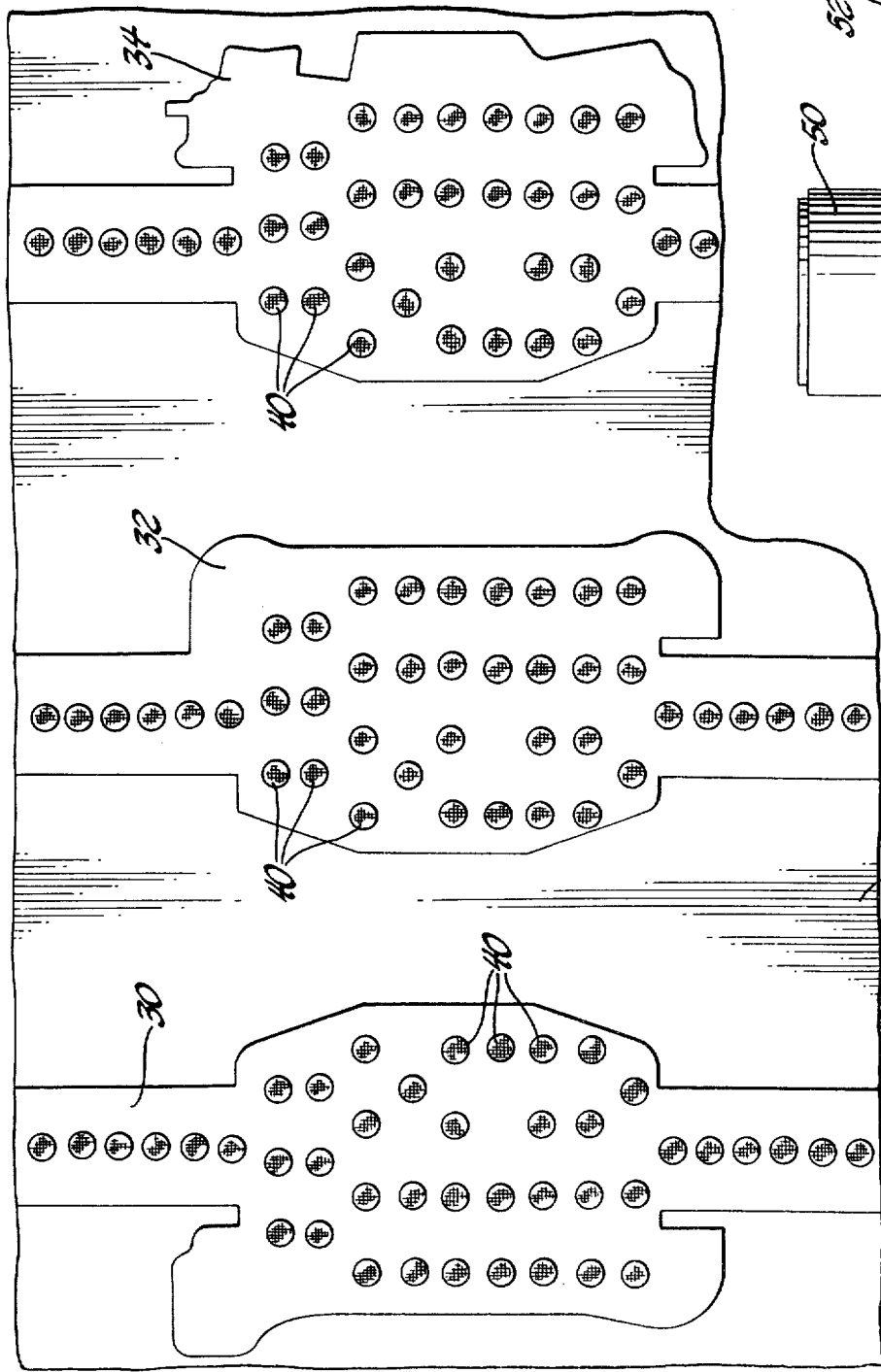

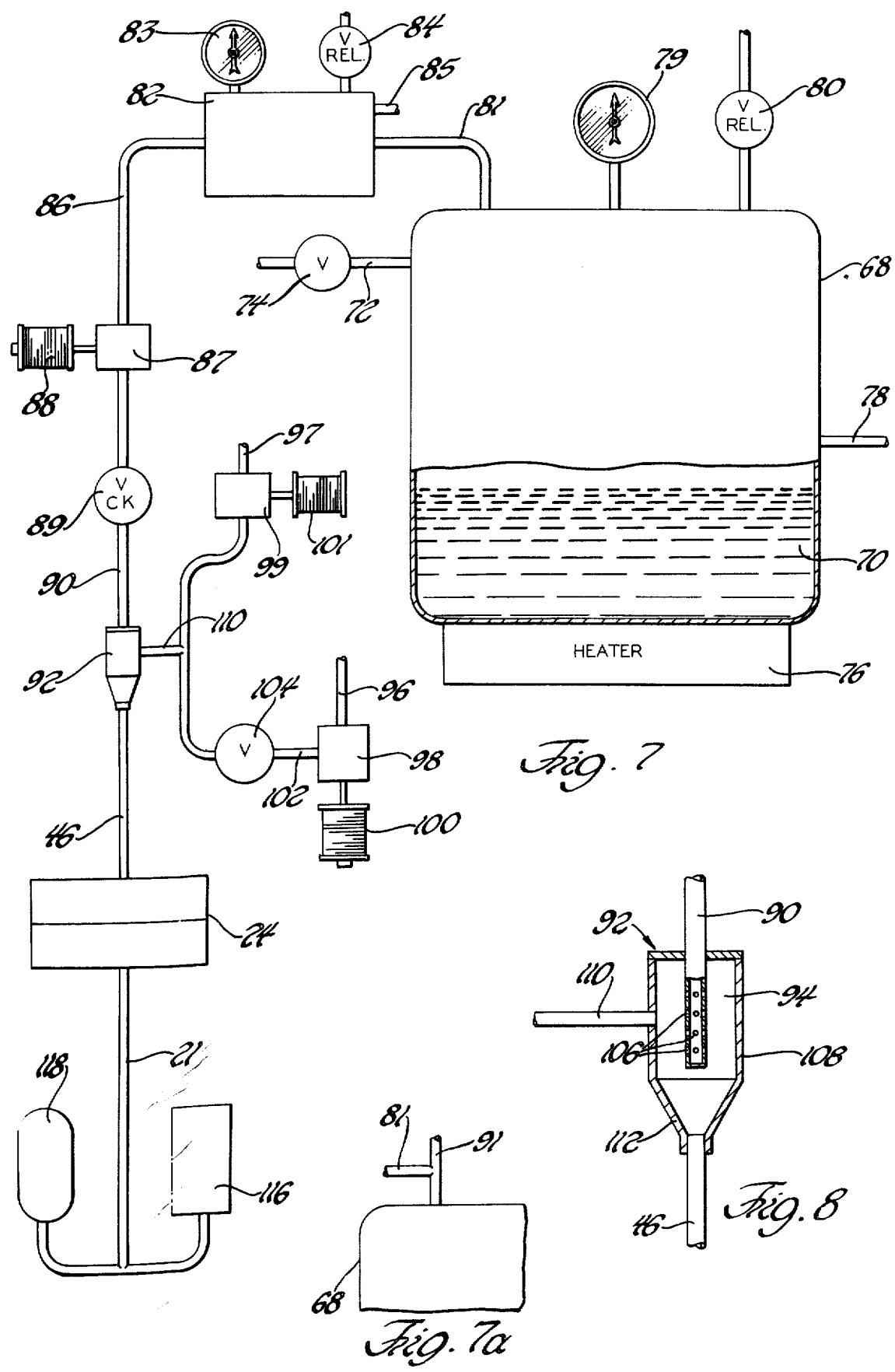

METHOD OF MAKING A FOUNDRY CORE

This application relates to the production of foundry cores for use in metal casting operations. More particularly, this application relates to a method and apparatus for producing foundry cores by a gassing technique, the technique being faster than previously known processes, utilizing less raw materials and eliminating many gassing equipment maintenance problems. The cores produced in accordance with the invention exhibit high strength, dimensional accuracy and an excellent surface finish.

As is well known, foundry cores or molds are employed in metal casting operations in which it is desired to form metal objects having one or more cavities therein. The core or cores are positioned in the mold in which the metal is to be cast and the molten metal introduced thereabout so that the position occupied by the core forms the void or cavity in the final cast metal object.

Foundry cores and molds are normally made from sand or similar commonly known refractory material, the particles of which are held in the desired shape by means of a binder. The process generally employed comprises mixing the sand or other refractory material and the binder, forming the mixture by suitable means into a desired shape, allowing the shaped product to remain in a supporting means such as a mold within a core box and treating the core in some manner to develop sufficient green strength to enable it to be handled. The green strength is developed by various methods which are employed to cause the binder in the core or mold to cure or set up. It is desirable both from an efficiency point of view and from the standpoint of dimensional accuracy in the final molded product to obtain this green cure of the binder if possible within a minimum amount of time. In fact, it is most desirable to completely cure or set up the binder within the core or mold within a matter of seconds.

Various methods have been employed in the past in an attempt to achieve a rapid cure or setting-up of the binder material. One of these methods involves simultaneously blending both a binder and a heat-sensitive curing agent, or catalyst, for the binder with the sand or other refractory material prior to shaping the material into the desired form. In accordance with that method, after the shaping operation, the cores, while being retained in a suitable support means such as a mold configuration within a core box, are exposed to sufficient heat to cause the curing agent or catalyst to become activated and cure or set up the binding material. This method, because of the fact that it involves heating the core box containing the cores with furnace devices, is typically referred to as the hot-box method. This method has several marked deficiencies including: (1) the requirement for excessive cure times and even post cure treatment in furnaces to develop sufficient strength for use in casting operations; (2) distortions in configuration or dimensional accuracy due to excessive heating required; and (3) over-cure or burning due to high temperatures required.

Because of these deficiencies and others encountered in the hot-box method of producing foundry cores, those skilled in the art have sought other methods of curing or setting-up the binders employed in the formation of foundry cores. Among the various methods employed is the so-called cold-box method. That method comprises: mixing a binder, typically a thermosetting or cross-linking resin with the sane or other refractory material; shaping this foundry aggregate by suitable means; and introducing into the shaped core a catalyst or curing agent which will react at room temperature to provide a hard, finally cured product. Ideally, such a process involves exposure of the binder containing core platform to curing agent for a sufficient time, while still within the mold or shaping device, to completely cure the binder and thereby eliminate subsequent heating in a furnace or the like. One of the primary problems associated with such a cold-box process is in providing a manner of introducing the curing agent or catalyst into the shaped core preform so as to effect an efficient, complete and rapid cure or setting-up of the binder.

One such cold-box process is disclosed in U.S. Pat. No. 3,409,579 issued Nov. 5, 1968 to Robins. That patent is specifically directed to a method of employing a particular binder system, the binder comprising a mixture of a phenolic resin with a polyisocyanate. Such a binder system may be cured by exposure to a curing or cross-linking agent such as an amine at room temperature and the patent proposes a method whereby shaped core preforms may be exposed to the curing or cross-linking agent. This proposed method involves passing a tertiary amine through the mold shape by, for example, volatilizing small quantities of the tertiary amine into an inert gas stream and then passing the stream through the molded shape. In accordance with the teachings of the patent, the amine may be dispersed in any "inert gas" which does not itself enter into the reaction involved in the curing operation. Included in such "inert gasses" are nitrogen and air. The patent merely teaches that the curing agent, i.e. the tertiary amine, may be suspended in the inert gas stream and pass therein under sufficient pressure to penetrate the molded shape, the inert gas-tertiary amine suspension being passed through the mold until the resin has been cured. The patent discloses that low pressure may be employed in passing the suspension through the cores since they are quite porous.

Several problems have been encountered in attempting to practice the invention of the Robins patent. The first of these problems involves the introduction of the inert gas stream containing the curing agent into the preformed core. By merely introducing this stream under low pressure into the core it is not possible to obtain uniform dispersion of the curing or cross-linking agent into all portions of the preform. This, of course, results in a non-uniform cure of the preform and in many cases incomplete cure of large portions of the core. In an attempt to overcome this problem it has been necessary to employ excessively long curing or gassing cycles, thus resulting in excessive expenditures of time and inefficient use of the curing or cross-linking agent. However, even when such excessive gassing times are used, the final cores in many cases exhibit a non-uniform cure or incomplete cure of certain portions of the core, thus resulting in a reduction in strength of the core body. A second problem associated with the process of the Robins patent involves the entrainment of curing agent in the inert gas stream. Generally processes and apparatuses employed in the practice of the invention of the Robins patent have been insufficient to provide a continuously ready supply of an inert gas containing a curing agent under sufficient pressure. The lack of a continuous supply of pressurized gas, of course, has resulted in excessive cure times. A still further problem associated with the process of the Robins patent is that of excessive odor from the curing agent. Because of the nature of the process excessive gassing times are necessary, as mentioned above, thus resulting in the introduction of far greater quantities of the curing agent-inert gas stream than stoichiometrically necessary for curing the binder. This excess curing agent has a strong odor and in most cases creates an undesirable environment in which to work.

A second cold-box technique developed as an alternative to the hot-box method discussed above, involves the use of two gassing cycles rather than one. In the first cycle a curing agent in an inert gas, as in the Robins process, is introduced under relatively low pressure. The second cycle comprises introducing further inert gas or compressed dry air at a higher pressure to both disperse the curing or cross-linking agent and purge the unused curing agent from the core. While this process obviates some of the problems of the Robins process by better distributing the curing agent within the core, it still has serious short-comings. Even though the second gassing cycle of inert gas or compressed air is intended to disperse the curing gas throughout the core, both the curing agent and the purge gasses tend to travel through the core in the path of least resistance. Thus, even this process results in non-uniform exposure of portions of the core to the curing agent. This, of course, results in excessive curing times, inefficient use of curing agent and a lack of optimal strength in the finished core.

Thus, the prior art cold-box technique suffer from several significant disadvantages: (1) they require excessive curing or gassing time; (2) they require the use of excessive amounts of curing agent or catalyst; and (3) the core bodies formed thereby often exhibit less than optimal strength due to incomplete curing of the binder therein. It has been found that by employing the method and apparatus of this invention, on the other hand, foundry cores exhibiting dimensional accuracy, surface smoothness, and maximal strength due to complete curing of the binder therein can be produced in less than 30 seconds and in many cases less than 10 seconds.

Accordingly, it is a principal object of this invention to form a foundry core by the use of a cold-box process wherein the binder dispersed in the preformed foundry core is rapidly, efficiently and completely cured or cross-linked to form a foundry core having excellent strength as well as dimensional accuracy.

It is a further object of the invention to provide an apparatus adapted to carry out the process of the invention and to provide a method of converting a conventional hot-box apparatus for producing foundry cores to such an apparatus for carrying out the process of this invention.

It is a still further object of this invention to provide a novel electrical circuit for controlling the apparatus of this invention.

BRIEF DESCRIPTION OF THE INVENTION

The invention briefly relates to a gassing technique for forming and curing cores which is faster than previous techniques, causes less odor, is safer and eliminates many gassing equipment maintenance problems. Use of the invention results in increased foundry coreroom capacity, lower cost per unit and improved internal and external environment. Furthermore, the invention improves casting quality due to lower gas content, results in greater casting accuracy permitting weight reduction, reduces tooling costs and uses no cooling water.

The basic principal of the method involves having an instant source of curing gas under pressure delivered to a closed system core box, which has a manifold and gasketing system that distributes curing gas to various areas of the core box, both light and heavy core sections, in such a way as to prevent channelling of the gasses. After delivery of metered amounts of curing gas to the various sections, a second gas or purge air is used at high pressures to force and distribute curing gas to all sections instantaneously by being excessive to the core venting system which conveys the gasses after completion of the gassing cycles to an after burner for odor control. More particularly, the process of the invention briefly comprises: mixing a foundry aggregate with a curable binder; shaping the mixture to form a green body in an enclosed mold having venting means therein; introducing a first gas comprising a curing agent under pressure into said body; and immediately thereafter introducing a second gas such as dry air under pressure into said body such that said venting means is unable to vent said first and second gasses and a back pressure is created causing said gasses, including said curing agent, to be driven throughout said body to uniformly and completely cure said curable binder.

In the preferred process of the invention the first gas is introduced into said body in two stages, the gas being introduced during said first stage at a relatively low pressure and for such a time period as will accomplish a "flash" cure of the resin in the outer surface of the green core. The first gas may then be introduced during the second stage at a substantially higher pressure if necessary to effect a complete cure of the resin in the core without causing resin to be deposited on the interior surfaces of the mold in which the green body is retained.

An additional variation of the process involves the introduction of a third pressurized gas into the enclosed mold means subsequently to the second pressurized gas or purge. This third pressurized gas comprises a gas which will neutralize the odor of the residual curing agent remaining in the cured core and thus aid in the reduction of odor.

The apparatus for accomplishing the method of the invention broadly comprises a means for mixing a foundry aggregate with a curable binder; enclosed mold means, including venting means, for shaping said mixture to form a green body; and means for sequentially introducing a first pressurized gas into said enclosed mold, wherein said venting means is adapted to cause a back pressure upon introduction of said first and second pressurized gasses into said enclosed mold, thus causing said gasses, including the curing agent, to be driven throughout said enclosed mold and thereby equalizing the pressure from said gasses throughout the body formed therein.

The means for introducing the pressurized gasses into the enclosed mold means comprises a manifolded gassing plate which is adapted to be positioned in sealed relationship with said enclosed mold means to form a chamber therebetween. The pressurized gasses are introduced through the gassing plate and into the chamber to produce zones of said gasses prior to passing into the enclosed mold means. Thus, the apparatus accomplishes the desired distribution of the gasses so as to effect a complete and efficient cure by helping to eliminate channelling of the gasses through the core bodies in the path of least resistance.

The invention also includes a method of converting a hot-box apparatus for producing foundry cores to an apparatus for producing foundry cores at ambient temperature. This method comprises: (1) removing the furnace means from above and below the core box means of the apparatus; (2) providing means for supplying an instantaneous supply of a first pressurized gas comprising a curing vapor solution of a normally liquid curing agent and an inert carrier gas; (3) providing means for supplying a second pressurized gas comprising dry air; (4) providing a manifolded gassing plate adapted to be positioned in sealed engagement with said core box means and being adapted to deliver said curing vapor solution from said supply to said core box means; (5) sealing said core box means and providing venting means to allow controlled venting of gasses introduced into said core box means, said venting means being adapted to be unable to immediately vent said gasses such that a back pressure is created and said gas is uniformly distributed throughout the green core bodies within said core box means.

The novel electrical circuit of the invention for controlling the apparatus thereof comprises a first control means for sequentially generating a first control signal to initiate core gassing and for positioning a means for supplying pressurized gas, a second control means enabled by said first control signal for sequentially developing a second control signal and for initiating a first gassing cycle, a third control means enabled by said second control signal for sequentially developing a third control signal and for initiating a second gassing cycle, and a fourth control means enabled by said third control signal for terminating all control signals and resetting said first control means.

The operation of the gassing apparatus when carrying out the preferred process of the invention is controlled by a novel electrical circuit similar to that discussed above but including separate subcontrol means for each of the gassing stages of the first gassing cycle.

THE DRAWINGS

FIG. 2 is a cross-section taken along lines 2—2 of FIG. 1 and showing a plan view of the upper surface of the manifolded gassing plate of the invention;

FIG. 3 is a cross-section taken along lines 3—3 of FIG. 1 and showing a plan view of the lower surface of the gassing plate of the invention;

FIG. 4 is a cross-sectional view taken along lines 4—4 of FIG. 1 and showing the lower section of the core box employed in the apparatus of this invention;

FIG. 5 is taken along lines 5—5 of FIG. 2 and shows a side view of a portion of the manifolded gassing plate of the invention;

FIG. 7 is a side view of an apparatus for producing the pressurized gas comprising the dispersion of a vapor of a normally liquid curing agent in an inert gas;

FIG. 7a is a side view of a variation of a portion of the apparatus of FIG. 7;

FIG. 8 shows a cutaway view of an apparatus for diluting the vapor dispersion produced by the apparatus in FIG. 7 prior to introducing the same into the core preform;

DETAILED DESCRIPTION OF THE INVENTION

Figure 1:
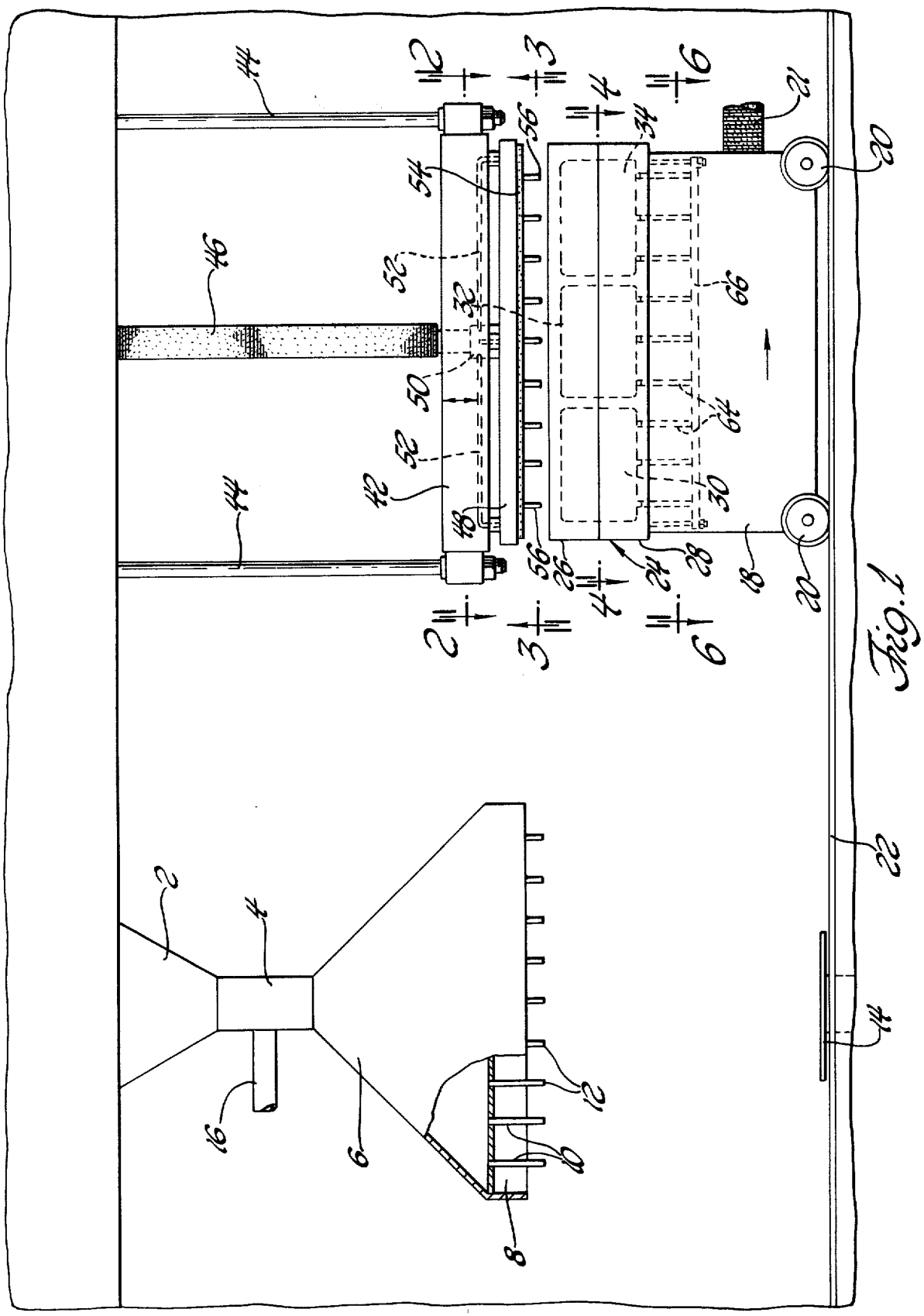
FIG. 1 is a side view of a portion of the apparatus of the invention.

The subject method for manufacturing foundry cores, the novel apparatus for performing the same and the novel circuitry for controlling said apparatus as well as the various features and advantages thereof will be best understood from a reading of the following detailed description of the invention. This description is to be taken with the accompanying drawings which will be described in greater detail hereinafter.

THE PROCESS

In accordance with the process of this invention a refractory foundry material is mixed with a resin or binder which may be cured by a liquid curing agent. The term "refractory foundry material" is intended to refer to unused and/or reclaimed nondeleterious refractory material which may be admixed with members of a polymerizable mixture so as to produce a curable mixture which may be shaped and hardened sufficiently so as to produce a core having a desirable tensile strength, without necessitating the application of heat. Thus, this phrase is intended to include conventional washed refractory materials such as exemplified by washed crude alumina, silica and clays. For example, Ottawa sand, Lake sand, Berkely Float sand, Muskegan lake and bank sands, Vassar sand, ground Zircon and ground Olivene all produce satisfactory cores, The refractory material should be free of any deleterious materials which tend to interfere with the effect of curing of the polymerizable mixture; however, the sand or other refractory material may be optionally mixed with other ingredients such as iron oxide, ground flax fibers, wood flour, cereal, pitch and the like. The most effective results are obtained with dry refractory materials and it is most preferable that the material have a moisture level below 0.2 percent. Moisture levels above this amount tend to reduce the ultimate tensile strength and bench life of the finished foundry core.

The binder or resin which is admixed with the refractory foundry material may be any of a number of well-known organic or inorganic materials known to be useful for bonding such refractory materials and being hardenable or curable upon exposure thereto of a normally liquid catalyst or curing agent. A preferred binder or resin system which may be employed in the process of this invention is the combination of a phenolic resin dissolved in a nonaqueous solvent and sufficient polyisocyanate to cross-link the phonolic resin. Such a system is disclosed in the above-mentioned U.S. Pat. No. 3,409,579. In accordance with the teachings of that patent, any phenolic resin which is substantially free of water and which is soluble in an organic solvent may be employed. The term phenolic resin as defined in the patent is intended to encompass any polymeric condensation product obtained by the reaction of a phenol with an aldehyde. The polyisocyanates useful in the binder may be selected from aliphatic, cycloaliphatic, or aromatic polyisocyanates preferably having from two to five isocyanate groups.

Examples of the many other known curable binders useful in the process of this invention include phenol-formaldehyde resins, furfuryl alcohol modified urea-formaldehyde resins, drying oils, urethane oils and vinyl ethers. These binders may all be cured or cross-linked at room temperature by various curing agents or catalysts well known in the art.

The various binders or curing agents should be blended with the refractory material in amounts sufficient to provide a strong bond throughout the core. Of course, the amounts of each binder necessary for a given core will depend on the size of the core, the type of binder and the exact nature of the refractory foundry material. In any event the optimal amount of binder for a given core may be determined with minimal experimentation. In most cases, however, the binder will be present in an amount of between about 0.5 and about 10 percent by weight of the aggregate.

After the refractory foundry material and the curable binder are thoroughly mixed, the aggregate is rammed, blown or otherwise introduced into a pattern to form a core preform or green body having the desired shape. The core preform or green body is maintained in the pattern and supported thereby during the ensuing curing process, the core being removed therefrom only after the curable binder contained therein is completely cured and the optimum tensile strength has been developed.

After the shaping operation and while the green core is maintained in the pattern as discussed above, a first pressurized gas is introduced into the body. This pressurized gas comprises a curing vapor solution of a normally liquid curing agent and an inert carrier gas. This vapor solution is introduced into the body preferably at a pressure of between about 4 and about 40 pounds per square inch for a time period which preferably ranges from about ¼ second to about 7 seconds. Of course the pressure and time selected are each dependent on the other as well as the size of the core, the type of binder being used, and the type and amount of curing agent included in the first pressurized gas.

By way of example, it had been found that when the phenolic-isocyanate binder system discussed above is dispersed in a refractory foundry material and cured with N,N dimethylethylamine, a tertiary amine, in carbon dioxide as a 5 percent vapor, solution by volume under a pressure of 17 to 20 pounds per square inch, the following gassing times are suitable:

0.25 to 1.5 seconds for a core weighing 4 ounces to 50 lbs.

1.0 to 3.0 seconds for a core weighing 50 to 100 pounds 2.0 to 7.0 seconds for a core weighing more than 100 pounds Of course, it should be appreciated that optimal pressures and concentrations for the first pressurized gas may be determined preferably within the above discussed range by routine experimentation. As mentioned above, it should be appreciated that other curing agents such as triethylamine take longer to cure the resin in a given size core than does N,N dimethylethylamine.

While the first pressurized gas including the curing agent for the binder may be introduced into the green core body in a single stage as discussed above, it is preferable to introduce the first pressurized gas in two stages. It has been found that in many cases when the first pressurized gas is introduced in a single stage at pressures best suited to effect rapid cure of the binder, a portion of the binder is blown from the green core onto the walls of the mold in which the core is supported. This resin tends to stick to the mold walls and thus interferes with demolding of the cured cores. In addition, maintenance cost is increased and time is lost between preparation of cores since the resin must be removed from the mold walls such as by use of an organic solvent prior to refilling the mold with foundry aggregate.

It has been found, however, that this problem can be substantially alleviated by using the preferred two stage introduction of the first pressurized gas as mentioned above. The first stage of the preferred process comprises introducing the first pressurized gas at a relatively low pressure such as between about 4 and about 20 pounds per square inch and preferably between about 4 and about 5 pounds per square inch. By initially introducing the first pressurized gas including the curing agent at such a relatively low pressure it is possible to "flash" cure the outer surface of the core without causing resin to be blown onto the mold walls. This outer surface of the core having been cured, the second stage introduction of the first pressurized gas can be effected at higher pressures to insure complete cure of resin within the core without causing the resin near the surface to be blown onto the mold surface. The gas introduced during the second stage is preferably maintained at between 12 and 40 pounds per square inch. Of course, it should be recognized that the pressure of the gas introduced during each of the first and second stages will be dependent on a number of factors such as the time interval of each stage, the type of binder employed, the type and concentration of the curing agent, the size of the core being treated and others.

The term "inert carrier gas" as used herein is intended to include any gas which will not itself enter into the reaction of the curing agent or catalyst with the binder. Among the preferred gasses are carbon dioxide, nitrogen and dried air, with $CO_2$ being most preferred.

Among the curing agents or catalysts which may be used in the process of this invention are those disclosed in the above discussed Robins patent. Included in those curing agents are various amines and, in particular, tertiary amines such as triethylamine, trimethylamine and N,N dimethylethylamine. These curing agents or catalysts are particularly useful for curing or cross-linking the phenolic-polisocyanate binder system discussed above. Included in the many other useful curing or cross-linking agents known to those skilled in the art are various inorganic and organic acids or materials which react with moisture to form strong acids. It will be appreciated that this invention is not directed to the use of a particular combination of curable binder and curing or cross-linking agent. To the contrary, the process of this invention may be practiced with materials which are well known in the foundry art.

Immediately after the introduction of the first pressurized gas has terminated, a second gas under a pressure of between about 50 and about 100 pounds per square inch and preferably in the range of from about 80 to 85 pounds per square inch is introduced into said body. This second gas, also an inert gas, serves the dual function of dispersing the first gas throughout the core body and purging the curing agent from the cured core. The inert gas is preferably dried air such as shop air which has been processed through a drier and is preferably introduced into said body for a time interval substantially greater than the time interval for introducing the first pressurized gas. Generally the time interval will be in the range of from about 10 to about 20 seconds; however, gassing times of from about 5 seconds to about 30 seconds may be employed. Of course, the time interval for the introduction of this second pressurized gas will depend on several factors including the pressure used and the size of the core.

The pattern in which the core preform or green body is formed and supported during introduction of the above discussed first and second gasses is an enclosed mold which will be described in greater detail hereinafter. However, for purposes of the process in its broadest sense, it is sufficient that the enclosed mold include venting means designed so as to be unable to vent said first and second gasses as they are sequentially introduced. A venting means so designed or adjusted results in a back pressure being built up such that the gas pressure is equalized throughout the mold means and the curing agent is driven uniformly to all areas of the body within the mold. After the second gassing cycle has terminated, the venting means then serves to allow the gasses within the core to exhaust from the enclosed mold.

A further aspect of the method of this invention involves the provision of a ready, instantaneous supply of the first pressurized gas, a vapor solution of a normally liquid curing agent in an inert carrier gas. This aspect of the process allows the instantaneous introduction of the first gas under the desired pressure and including the desired concentration of curing agent on a continuous basis as needed.

A still further aspect of the process of the invention involves the introduction of a third pressurized gas into the body to neutralize any residual odor from the curing agent after completion of the purge cycle. This third pressurized gas may be any gas which will serve to neutralize odors remaining in the cured cores. Among the many suitable materials is ozone.

It will be appreciated that the process of this invention, by providing a continuously ready supply of a vapor solution including a selected concentration of a curing agent in an inert gas and by sequentially gassing into an enclosed mold having vent means which creates a back pressure, makes it possible to produce foundry cores having maximal strength due to complete and uniform curing of the binder in less than 30 seconds and in many cases, less than 10 seconds. It should be further appreciated that such an efficient core forming process results in a substantial cost savings over conventionally employed processes. This cost savings is effected not only because of a time savings in production but also because the process of the invention requires less of the curing agent gas than is necessary for other known cold-box operations. Of course, this reduction in required curing agent gas is a direct result of the use of the above-discussed purge cycle or second pressurized gas in conjunction with the controlled venting of the invention, the curing agent being efficiently utilized by being dispersed to all portions of the green core body being treated.

This method will be described in greater detail in conjunction with the following detailed description of the apparatus and circuitry of this invention.

THE APPARATUS

The apparatus of this invention comprises: a means for mixing a foundry aggregate with a curable binder; enclosed mold means, including venting means, for shaping the mixture to form a green body; and means for sequentially introducing a first pressurized gas including a curing agent in one stage or alternatively in several stages at varying pressure and a second pressurized gas into said enclosed mold, wherein the venting means is adapted to cause a back pressure upon introduction of the first and second pressurized gasses into the enclosed mold, thus causing the gasses including the curing agent to be driven throughout the enclosed mold and thereby equalizing the pressure from said gasses throughout the body formed therein.

As can be seen from FIG. 1, the means for mixing the foundry aggregate with the curable or cross-linkable binder material and introducing the same into the enclosed mold means comprises a mixing bin 2, a chute 4, and a storage-delivery portion 6 of a frusto-conical shape. The base of the truncated cone 6 comprises a blow plate 8 through which extend blow tubes 10. These tubes extend at 12 from the lower surface of the plate 8. In the operation of this portion of the apparatus, the curable or cross-linkable resin or binder and sand or other foundry aggregate are continuously introduced by means not shown into bin 2. Stirring means, not shown, within the bin serves to mix the materials together uniformly, thereby guaranteeing that the resin or binder will be dispersed throughout the core bodies ultimately formed from the aggregate-binder mixture. From bin 2, the mixture is directed laterally and downward into chute 4, from which the aggregate continually moves into the frusto-conical portion 6.

When it is desired to begin the operation of the apparatus to form the green cores, a car member 18 having wheels 20 moves into position on track members 22. The motion of the car member 18 is controlled by electronic circuitry, not shown, which activates hydraulic means, not shown, to drive the car 18 into position over hydraulic means 14 when a cycle is to begin. Once the car is in position beneath the plate 8, a valve controlling the movement of hydraulic member 14 is actuated and car 18 is raised into position.

The car 18 carries a core box means generally indicated at 24. This core box means includes upper and lower core box sections 26 and 28 respectively. In the specific apparatus shown in FIG. 1, the core box means actually consists of three individual core boxes which are sealed off from each other. The broken away sections in the core box means 24 shown at 30, 32, and 34 comprise individual enclosed molds in each of the three individually sealed core boxes. As hydraulic member 14 moves car 18 into position, the blow plate 8 is positioned in sealed engagement with core box means 24. This seal is effected by a sealing strip, not shown, which is disclosed about the periphery of the under surface of the blow plate 8.

As car 18 is raised by hydraulic device 14 and core box means 24 moves into sealed engagement with blow plate 8, portions 12 of blow tubes 10 are inserted into apertures in the upper surface of core box means 24. These apertures will be discussed hereinafter in greater detail with respect to FIG. 3. After core box means 24 and blow plate 8 are in sealed relationship the foundry aggregate maintained in portion 6 is blown into individual enclosed molds 30, 32 and 34 through blow tubes 10 by dried compressed air which is introduced through conduit 16. After this blowing operation, the individual enclosed molds 30, 32 and 34 each contain a compacted green core comprising refractory material having an uncured binder material dispersed uniformly throughout. It should be appreciated that the illustrated apparatus for blowing a green core is merely exemplary of a number of known apparatuses for shaping a green core body.

After the core body has been shaped, hydraulic member 14 lowers car 18 and hydraulic means not shown causes the car to move to the right as shown by the arrow thereon to the position indicated in FIG. 1. At this point, the green core bodies within the individual enclosed molds 30, 32, and 34 are further processed by the apparatus shown above the core box means 24 in FIG. 1. This apparatus comprises a portion of a means for sequentially introducing a first pressurized gas including a curing agent and a second pressurized gas which acts to distribute and purge the first gas into the enclosed molds 30, 32 and 34. In those instances where it is desirable to neutralize residual odors a third gas for that purpose may be introduced through the same means.

As mentioned previously, the individual molds 30, 32 and 34 are each enclosed in individual core boxes. These individual enclosed molds have vent means disposed therein. As can be seen in FIG. 4 which shows a sectional view of the core box means 24, the core box section 28 is essentially divided into three individual core boxes containing the molds 30, 32 and 34. Each of these enclosed molds includes vent means in the form of a plurality of vents 40. The vent means may take any form such as for example a single vent means or a valve in each of the enclosed mold means 30, 32 or 34. The important point is that the vents be fashioned or be adjustable in such a manner that upon introduction of the above-discussed first and second pressurized gasses, a back pressure is created due to the inability of the vent means to exhaust the same. This back pressure created by means of the particularly selected vent means 40 causes an equalization of pressure from the gasses throughout the green core body formed in the enclosed mold members. This allows the curing agent to be distributed quickly and uniformly to all areas of the green core body.

The portion of the apparatus for sequentially supplying the pressurized gasses as shown in FIG. 1 comprises a machine head 42, machine head supports 44, conduit means 46 for conducting pressurized gasses from original gas sources, a gassing plate 48, a central pressurized gas source 50 positioned on the upper surface of said gassing plate, a plurality of conduit means 52 for carrying pressurized gasses from said central pressurized gas source to apertures in the gassing plate, peripheral sealing member 54 on the lower surface of the gassing plate and pin members 56 disposed on the lower surface of the gassing plate.

The conduit means 46 for conducting pressurized gas from the original gas sources comprises a flexible tubing such as a pleated tubing which will expand or contract as the machine head is moved downward and upward during the operation of the apparatus. This conduit means or flexible tubing 46 carries the pressurized gasses from the original source to the central pressurized gas source 50 on the upper surface of the gassing plate. The central pressurized gas source and the plurality of conduits 52 leading therefrom comprises a manifolding means designed to distribute the pressurized gasses as required through the openings in the gassing plate to the individual enclosed molds and the green core bodies contained therein.

FIG. 2 is a sectional view taken along lines 2—2 of FIG. 1 and shows a plan view of the manifolding means of the apparatus. As may be noted from the drawing, the central pressurized gas source 50 into which the conduit means 46 introduces the pressurized gasses is centrally located of the gassing plate. From this central pressurized gas source, a plurality of conduit means or tubes 52 extend to various points on the upper surface of the gassing plate. Beneath each of the ends of the conduits or tubes 52 are apertures in the gassing plate 48 through which the pressurized gasses from the individual conduits pass. Members 38 comprise sealing strips located on the lower surface of the gassing plate 48. These strips as well as sealing strip 54 located peripherally of the lower surface of the gassing plate are formed of a sealing material such as that used for the sealing member on the lower surface of the blow plate 10. Also, the sealing members 38 and 54 are of such a thickness that even when the machine head is in a down position and the gassing plate 48 sealed with the core box means 24 there remains a space of ½ inch or more between the lower surface of the gassing plate and the upper surface of the core box means. This type of engagement creates three chambers or zones, one above each of the individual enclosed molds.

As also shown in FIG. 2, the manifolding means is designed so as to introduce the pressurized gasses through conduits 52 at three different points in each of the above-discussed chambers or zones. Of course, the manner in which the manifolding means is designed would depend upon the particular configuration of the molds within the core box member 24.

Also shown in FIG. 2 are six members 58 adapted to attach the gassing plate to the machine head 42 such that the gassing plate moves in unison with the machine head in an upward and downward manner as the apparatus is operated.

FIG. 5 shows a sectional view of the gassing plate 48 including the manifolding means, the section being taken along lines 5—5 of FIG. 2. This figure also shows the central pressurized gas source 50 and the conduit means 52 as well as the attachment member 58. Also shown on the lower surface of the plate 48 are pins 56 and a broken away portion of the peripheral sealing member 54. The function of the pins 56 will become more apparent hereinafter. The member 61 is one of a number of locating pins which serve to secure the gassing plate to the upper surface of the core box means 24 as the machine head 42 is lowered.

In the operation of the portion of the apparatus for sequentially introducing the gasses employed in the process of the invention, the car 18 first moves into position as shown in FIG. 1. As this occurs, valve means not shown is activated and the machine head support members 44 are caused to move downward and thereby move the machine head 42 downward into position over the core box means 24 carried on the car 18. When the machine head is lowered into its final position, the gassing plate 48 is in sealed engagement with the upper surface of the core box means as discussed above, the peripheral sealing member 54 and sealing members 38 serving to seal the gassing plate 48 with the core box member 24 and create three zones or chambers, one above each of the enclosed molds 30, 32 and 34. Pin members 56 on the lower surface of the gassing plate are inserted into holes in the top of the core box member, these holes being the same as those referred to previously in the discussion with respect to the blowing of sand into the individual enclosed molds to form the green bodies.

FIG. 3 shows a lower plan view of the gassing plate of this invention and is taken along lines 3—3 of FIG. 1. This view also shows the individual sealing members 38 which serve to form the three individual chambers or zones for introduction of gasses above the three individual enclosed molds. As also shown in FIG. 3, the gasses are introduced into each of the individual zones or chambers through three apertures 60. These apertures are those which receive the pressurized gas from the conduit members 52 of the manifold means discussed previously. By introducing the pressurized gasses into the chambers or zones at a plurality of points through apertures 60 a plurality of sub-zones are created. Thus, when the first pressurized gas including curing agent for the binder of the green core bodies is introduced through the manifold means and through the apertures 60 shown in FIG. 3, it tends to distribute itself in the chambers between the gassing plate and the top of the core box member 24 in three sub-zones. Of course, the number and disposition of the apertures 60 to introduce gasses into the chambers may vary depending upon the size and shape of the core to be gassed. Also, the flow of gas through each of the apertures 60 may be controlled by a damper 57 which is pivotally mounted beside each aperture 60 so that the aperture may be partially or completely closed, thus reducing the amount of gas introduced.

Following introduction of the first pressurized gas in either one or two stages as discussed above into the zone or chamber between the gassing plate and core box means 24, the gas passes into the enclosed molds 30, 32 and 34 through the apertures in the upper surface of the core box means 24 as discussed previously. These apertures are shown in phantom at 62 in FIG. 3. It will be noted that each of these apertures has inserted therein a pin member 56 extending from the lower surface of the gassing plate. These pin members 56 are smaller in diameter than the diameter of the aperture 62, thus resulting in an annular opening between the pin member and the aperture wall. The gases entrapped in the chamber between the gassing plate 48 and the upper surface of the core box means 24 are thus routed through these annular openings and into the enclosed molds. The apertures 62 and pin members 56 are so spaced as to provide the desired distribution of the pressurized gas from the sub-zones in the chambers into the mold. Of course, the number and disposition of these apertures 62 may also be varied depending upon the shape of the core being formed.

After introduction of the first pressurized gas including the curing agent at relatively low pressures as discussed previously, (i.e., between 4 and 40 psi), there remains a quantity of that gas which fills the chamber between the lower surface of the gassing plate and the upper surface of the core box member. Thus, when the second pressurized gas is introduced through the conduit members 52 and then through the apertures 60 into each chamber, it serves as a driving force to force the curing agent through apertures 62 and into the individual enclosed molds 30, 32, and 34. As both the first pressurized gas including the curing agent and the second pressurized gas pass through the apertures and into the enclosed molds, the venting means previously selected or adjusted for the particular gas pressures being used is unable to vent the gas flow and thereby causes a back pressure to be created, thus equalizing pressures throughout the enclosed molds and causing the curing agent to be forced uniformly throughout the green core bodies. Once the introduction of the second pressurized gas has terminated, the venting means are then able to handle both the first and second gasses and they are exhausted from the enclosed molds.

As the gasses are exhausted from the enclosed molds 30, 32 and 34 after introduction of the second gas is terminated, they pass into lower portions of the car 18 which is sealed except for a single opening to which exhaust pipe 21 is connected. The gasses thus exhaust through pipe 21 to a conventional scrubber or to a furnace where they are burned. It will be appreciated that the sealed unit of this invention including enclosed molds with controlled venting not only decreases gassing times necessary for curing as indicated above, but also substantially eliminates exhaust odors.

Figure 6:
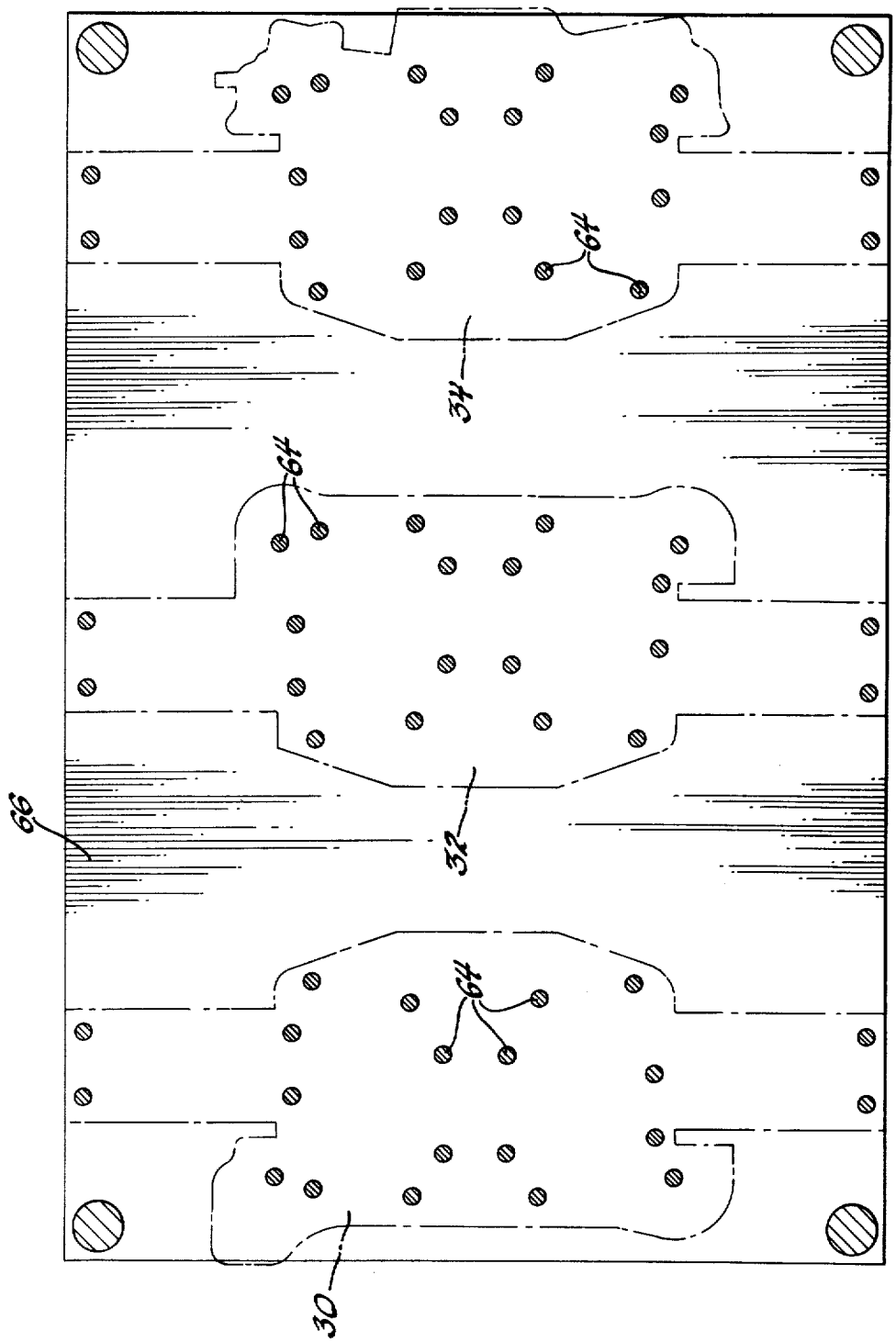
FIG. 6 is taken along lines 6—6 of FIG. 1 and shows an upper plan view of the lower stripping plate of the apparatus of the invention.

After the gassing cycle has been completed and the core bodies have developed maximum tensile strength, the bodies being completely and uniformly cured by the curing agent in the first pressurized gas, the machine head 42 is caused to move upward and carries the gassing plate 48 with it. The apparatus is also designed such that the upper section 26 of the core box means moves in an upward direction, thus exposing the finished core bodies. At this point lower stripper pins 64 shown in FIG. 1 attached to a stripper plate 66 are raised as the plate is moved upwardly within the car 18 to cause the finished cores to be raised out of the individual molds. The finished bodies so raised by the stripper pins are then removed from the mold by suitable means, not shown. By referring to FIG. 1, it should be clear that the stripper pins 64, when in a downward position are in sealed engagement with apertures in the lower portion of the mold in the lower section 26 of the core box member 24. This sealed engagement is, of course, necessary in order to preclude leakage of the pressurized gas out of the enclosed mold and defeat the purpose of the venting means therein. FIG. 6 shows an upper plan view of the disposition of the stripper pins, the shape of the individual molds being shown in phantom.

The means for sequentially introducing said first and second pressurized gasses into the core box means 24 and the enclosed molds 30, 32 and 34 therein includes, in addition to the apparatus discussed above, an apparatus for producing, storing and delivering the first pressurized gas under pressure to the central pressurized gas source 50. As noted above, this first pressurized gas comprises a vapor solution of a normally liquid curing agent and an inert carrier gas. The apparatus further includes a means for storing and delivering the second pressurized gas under pressure to the central pressurized gas source 50.

The apparatus for providing a continuous, readily available source of the first pressurized gas including the curing agent for the binder included in the green core body is shown in FIG. 7. A generating means or tank 68 is adapted to contain a pool of said normally liquid curing agent 70 therein. This liquid curing agent is introduced into the tank through a pipe 72 which is provided with a valve 74 for controlling the flow therethrough. A heating means 76 such as a heater disposed beneath the tank serves to heat the liquid curing agent to vaporize same. Of course, any suitable heating element could be employed; for example, the heating means could be included within the tank itself or take the form of a coil disposed about the tank. Also, the means for vaporizing the curing agent need not be limited to a heater but may include any suitable device for providing a vapor. For example, the apparatus could include an aspirator to disperse the curing vapor into the pressurized inert gas within the generating tank 68. An inert carrier gas as defined above, is introduced into the tank or holding means 68 through a pipe 78. The inert carrier gas is introduced into the tank under the pressure necessary to maintain a properly pressurized vapor solution of the curing agent and the inert carrier gas. Of course, the artisan will be able to determine the pressure necessary to maintain the desired percentage of a given curing agent in vapor solution. The tank is provided with a pressure regulator means 79 which is calibrated to read the pressure in the tank and to provide a signal to a valve means, not shown, which will allow additional carrier gas to flow through the pipe 78 into the tank whenever the pressure of the gas within the tank falls below a minimum level. The tank is also provided with a relief valve 80.

From generating tank 68 the vapor solution passes through conduit means or pipe 81 to a surge tank 82 where it is stored pending introduction into the core box means 24. This tank also includes a pressure regulator 83 and a relief valve 84 to control the pressure of the vapor solution within the tank. Additional inert carrier gas may be introduced through pipe 85 to increase the pressure within surge tank 82 or to dilute the vapor solution if desired. Tank 82 is designed to hold a supply of the first pressurized gas necessary for curing the resin within the green core bodies within core box means 24. It will be appreciated that by providing such a surge tank the apparatus is capable of delivering an instantaneous, metered supply of curing agent gas at a given pressure.

A conduit means or pipe 86 serves to carry the first pressurized gas comprising the vapor solution of the curing agent and the inert carrier gas from surge tank 82 to valve 87 which is controlled by solenoid 88. When the gassing plate has been positioned in sealed engagement with the core box means 24 the electrically controlled valve 87 is opened to allow the gas to flow therethrough and subsequently through a check valve 89 into a conduit pipe 90. In the case where the pressure of the gas within surge tank 82 has not reached the desired pressure it may be necessary to introduce additional inert carrier gas through pipe 85 even as the valve 87 is opened.

As an alternative to the surge tank 82 the conduit or pipe between the generating tank 68 and valve 87 may be designed so as to store a sufficient quantity of the first pressurized gas so as to act as a surge tank in and of itself. As shown in FIG. 7a pipe 91 may join with pipe 81 which serves as a surge tank so as to provide additional inert carrier gas for added pressure if desired.

In many instances it may be convenient to form and store the first pressurized gas as a vapor solution containing a greater percentage of curing vapor than is necessary for effective curing. For example, it is convenient to form and store a first pressurized gas containing vapor of N,N dimethylethylamine as a saturated vapor solution. Thus, at 20 pounds per square inch, a preferred pressure for the first gas, the vapor solution contains approximately 20 percent by volume of the curing agent. A suitable level for curing the phenolisocyanate binder system discussed above, however, is approximately 5 percent by volume. Therefore, in many cases it may be necessary to dilute the vapor solution with additional inert carrier gas.

A device for accomplishing this dilution is shown at 92 in FIG. 7. This device shown in enlarged section in FIG. 8 comprises a T-joint having the pipe or conduit 90 carrying the vapor solution of the curing agent from the surge tank 82 inserted therein. The section of the T-joint into which the pipe 90 is inserted is larger in diameter than the pipe 90, thus producing a calculated annular opening 94 between the outside diameter of the pipe 90 and the inside diameter of the T-joint section 108. The pipe 90 inserted into the T-joint is sealed at the end thereof within the section 108 and holes 106 are drilled in the pipe 90 to allow the first pressurized gas to escape into the annular space 94. Additional inert carrier gas is then introduced through T-joint section 110 and caused to mix with the first pressurized gas while in the annular opening 94. The additional inert carrier gas which is introduced into the T-joint section 110 to dilute the vapor solution may be fed from a source through pipe 97 to valve 99 which is controlled by solenoid 101. After dilution, the gas then passes out of the mixing means through section 112 and into pipe or conduit 46 which continues on the core box means 24. It will be appreciated that the space 94 between the pipe 90 and section 108 as well as the number and size of openings 106 in the pipe 90 may be precalculated in order to determine an optimal design for accomplishing the dilution desired.

When the first pressurized gas is to be introduced in two stages as is preferred in accordance with the method of the invention the electrically controlled valves 87 and 99 may be activated in sequence by circuitry to be discussed hereinafter to provide the desired concentration of curing vapor for each stage. As mentioned above, the purpose of the first stage of the first gassing cycle is to cure the outer surfaces of the core bodies at relatively low pressure. Since it is desirable to quickly or "flash" cure the surface, it has been found desirable to introduce the gas during the first stage in undiluted concentration. Thus, during the first stage only valve 87 is opened and the gas passes through device 92 without dilution. However, since the gas passing from surge tank 82 may contain a greater concentration of curing agent than is necessary for the second stage of the first gassing cycle to effect complete cure of the binder, during this stage valve 99 is opened simultaneously with valve 87 and additional inert carrier gas passes through T-joint section 110 into device 92 where dilution takes place.

The source of the second pressurized gas, which is preferably dried shop air, may be a cylinder of comressed air, not shown. This air is passed through a conduit means or pipe 96 to an electrically controlled valve 8 controlled by a solenoid 100. Immediately after the rst gassing cycle has been completed, i.e., after the introduction of the first pressurized gas into the core box ieans 24, the valve 98 is activated and the compressed ir passes therethrough and into the pipe 102, through le valve 104, through device 92 and into conduit 46. y routing this purge air through device 92 a complete urge of the lines is effected. In the instance where a iird pressurized gas such as ozone is used to neutralize dors after introduction of the second pressurized gas, may also be introduced through T-joint section 110. As schematically shown in FIG. 7 and also discussed bove, the gasses all travel through pipe or conduit 46 ) the core box means 24 and are then exhausted irough pipe or conduit 21 to either a scrubber 118 or furnace 116.

CONVERSION OF HOT-BOX APPARATUS

As discussed previously, the invention also includes method of converting conventional hot-box equipient for forming foundry cores into an apparatus such s discussed herein which is suitable for practicing the iethod of the invention. Hot-box equipment, which is 'ell known, is similar in appearance to the apparatus iown in FIG. 1 but includes furnace means disposed bove and below the core box means for effecting a ure of the heat sensitive resin within the green core odies. Typically, one such furnace means would be ipported above the core box means and another 'ould be supported by car 18. Of course, because of le nature of such hot-box apparatus, the car 18 is not ealed nor are either of the furnaces in sealed engageient with core box means 24. Also, such prior art quipment includes no means for delivering and dis-ibuting pressurized gasses since the curing is done by eat.

The process of converting the equipment to the apparatus suitable for practicing the process of this invenon comprises: (1) removing the furnace means from bove and below core box means 24; (2) providing ieans for supplying an instantaneous supply of a first ressurized gas comprising a curing vapor gas; (3) proided means for supplying a second pressurized gas omprising an inert gas such as dry air suitable for dis-:ibuting the first pressurized gas throughout the core ox means and for purging the system of the first pressurized gas without interfering with the curing of the esin; (4) providing a manifolded gassing plate and supporting the same on machine head 42 such that it is dapted to be positioned in sealed engagement with pper core box section 26; and (5) sealing core box ieans 24 and providing venting means to allow con-olled venting of gasses introduced into the same, said enting means being adapted to be unable to immeditely vent said gasses such that a back pressure is creted and the gas is uniformly distributed throughout ny green core bodies within core box means 24. The etails of each of the means added to the hot-box apparatus from which the furnace means are removed are et forth above in the detailed description of the apparatus.

A further modification of the hot-box equipment hich can be made involves providing, in addition to ie manifolded gassing plate such as shown at 48 in IG. 1, a second manifolded plate below core box means 24. Such a modification would allow gassing from both sides of the green cores and thereby reduce the required intervals for gassing.

THE CIRCUITRY

The electrical circuitry for controlling the introduction of the first and second pressurized gasses into the enclosed molds of the above-discussed apparatus comprises: a first control means for sequentially generating a first control signal to initiate core gassing and for positioning a means for supplying pressurized gas; a second control means enabled by said first control signal for sequentially developing a second control signal and for initiating a first gassing cycle; a third control means enabled by said second control signal for sequentially developing a third control signal and for initiating a second gassing cycle; and a fourth control means enabled by said third control signal for terminating said first control signal and resetting said first control means. These various control means and the specifics of the circuitry will be further defined by the following specific description which is to be taken in conjunction with the circuit diagrams of FIGS. 9 and 10 as well as the apparatus of FIGS. 1 and 7.

The circuitry for controlling the introduction of the first and second pressurized gasses comes into operation as the car 18 moves into position on the track means 22 beneath the machine head 42 as shown in FIG. 1. As the car moves into position, it closes a limit switch 118 which initiates the operation of the first control means of the circuit. The limit switch 118 is interconnected with a second switch 118' such that the switches open and close in unison, the switch 118' being a part of the fourth control means of the circuit which will be discussed hereinafter.

After the switch 118 has been closed by the car 18, the first control means begins to operate due to completion of a circuit through closed contact 120 to solenoid 122. The solenoid is energized and causes a valve, not shown, to move and machine head supports 44 of FIG. 1 in a downward position so as to lower the machine head 42 into position for the gassing operation. As the machine head 42 is lowered, it trips a limit switch 124 which in turn completes a circuit to the control relay 126. This control relay serves to close contact 128 in the first control means as well as contact 150 of the second control means and contact 170 of the fourth control means. As the contact 128 in the first control means closes, a circuit is completed through closed contact 130 to a first timing device indicated by phantom lines and marked with the letter "A". The contact 130 merely serves as an interlock between right and left gassing systems should it be desired to operate the apparatus in FIG. 1 with two gassing stations. When one gassing station is in operation, the contact 130 of the circuit for the other station would be in an open state, thus deactivating the gassing cycle of the apparatus as shown. As the contact 128 closes, the signal passes through contact 130 and closed switch 132 to a timing motor 134. This timing motor acts in conjunction with a conventional cam array, not shown, for sequentially opening and closing switches. At the same time the circuit is completed to the motor 134, a signal also passes to the clutch 136. As the clutch is energized, it serves to engage the cam array with the motor 134. As the motor shaft turns with the cam array in engagement therewith, a cam first trips a switch 138 in the second control means of the circuit and thereby activates the second control means. Immediately after activation of the second control means, a second cam engages switch 132 and causes it to open. This cuts off the signal to the motor 134, and the motor ceases to operate. The clutch 136, however, remains energized and the cam array is held in position to maintain the switches in position.

Figure 9:
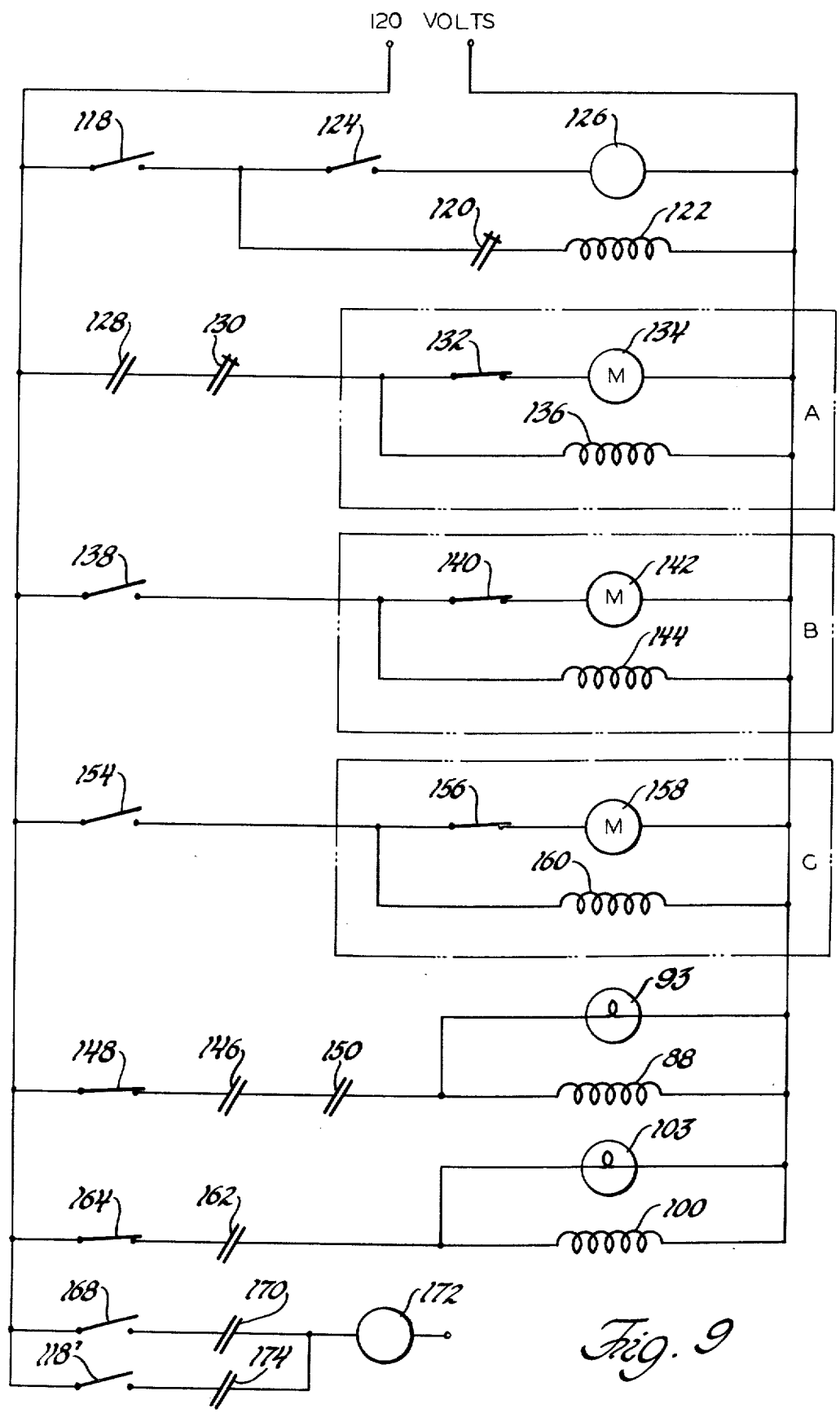
FIG. 9 shows a circuit diagram for the sequential control of a portion of the apparatus of the invention.

As the switch 138 is closed and the second control means activated, a circuit is completed to a second timing means surrounded by phantom lines and marked with the letter "B". As the signal passes into the timer, it passes through switch 140 to motor 142 which begins operation. This motor, like motor 134, operates in conjunction with a cam array after engagement of the cam array therewith by energized clutch 144. As the cam array turns in conjunction with the motor 142, a contact 146 is changed to a closed state. The contact 150 within the second control means, as previously mentioned, is in a closed state due to energizing of the control relay 126 in the first control means. Thus, a circuit is completed through closed switch 148, closed contact 146, and closed contact 150 to a solenoid 88. This solenoid is shown in both FIGS. 9 and 10 and it controls the opening and closing of the valve 87 in the first conduit means of the apparatus of FIG. 7. As the solenoid is energized, the valve 87 is opened and the first pressurized gas including the vapor solution of the carrying agent and the inert carrier gas is allowed to pass therethrough. While the solenoid 88 is energized and the valve 87 opened, the light 93 remains lighted on a control panel. When the apparatus is operated so as to provide only a single stage first gassing cycle the circuitry shown in FIG. 9 is adequate. In accordance with that circuit, after valve 87 has been opened a matter of seconds (i.e. preferably 2 to 7), a second cam causes switch 148 to be opened and curtails the signal to the solenoid 88, thus closing the valve 87 and terminating the first gassing cycle. At the same time that the switch 148 is opened and the first gassing cycle terminated, the switch 154 in the third control means is closed, thus activating the third control means. As was the case with the first control means, immediately after the next control means, in this case the third control means, is activated, the motor 142 ceases to operate due to opening of the switch 140. The clutch 144, however, maintains the cam array in engagement and thus maintains the switches in position.

As the switch 154 in the third control means is closed, a circuit is completed to a third timer surrounded by phantom lines and designated with the letter "C". As the circuit is completed to the timing means, a signal is set through closed switch 156 to a third timing motor 158 which begins operating. Once again, a cam array is caused to engage with the motor by clutch 160. As the cam array is turned by the motor, a contact 162 is changed to the closed state and a circuit is completed through closed switch 164 and closed contact 162 to the solenoid 100. This solenoid is also shown in FIG. 9 and controls the operation of the valve 98. As the solenoid is energized, the valve 98 is opened and a second pressurized gas is allowed to pass therethrough. As was the case with respect to the first gassing cycle, the bulb 103 on a control panel remains lighted while the solenoid 100 is energized and the valve 98 open. After a brief period of time, for example 5 to 30 seconds, the cam array causes switch 164 to open, thus terminating the signal to the solenoid, causing the valve 98 to close and the second gassing cycle to terminate. Simultaneously with the opening of switch 164, the cam array associated with motor 158 causes switch 168 in the fourth control means to close. The contact 170, as discussed previously, is in a closed state due to energizing of the control relay 126 in the first control means. As was the case in timers "A" and "B", the cam array associated with the motor 158 next causes switch 156 to open, thus terminating the signal to the motor. The clutch 160 remains energized, however, and maintains the cams in position.

The closing of switch 168 in the fourth control means causes the circuit to be completed through that switch and through the closed contact 170 to relay coil 172. Relay coil 172 is then energized and causes contact 174 to close. Since 118' is connected with and operates in conjunction with switch 118 in the first control means, it is closed and this completes a separate circuit to the control relay, bypassing switch 168 and contact 170. The control relay 172 also opens contact 120 in the first control means. This operates to discontinue the signal to the solenoid 122 and thereby begin the resetting of the apparatus.

Figure 10:
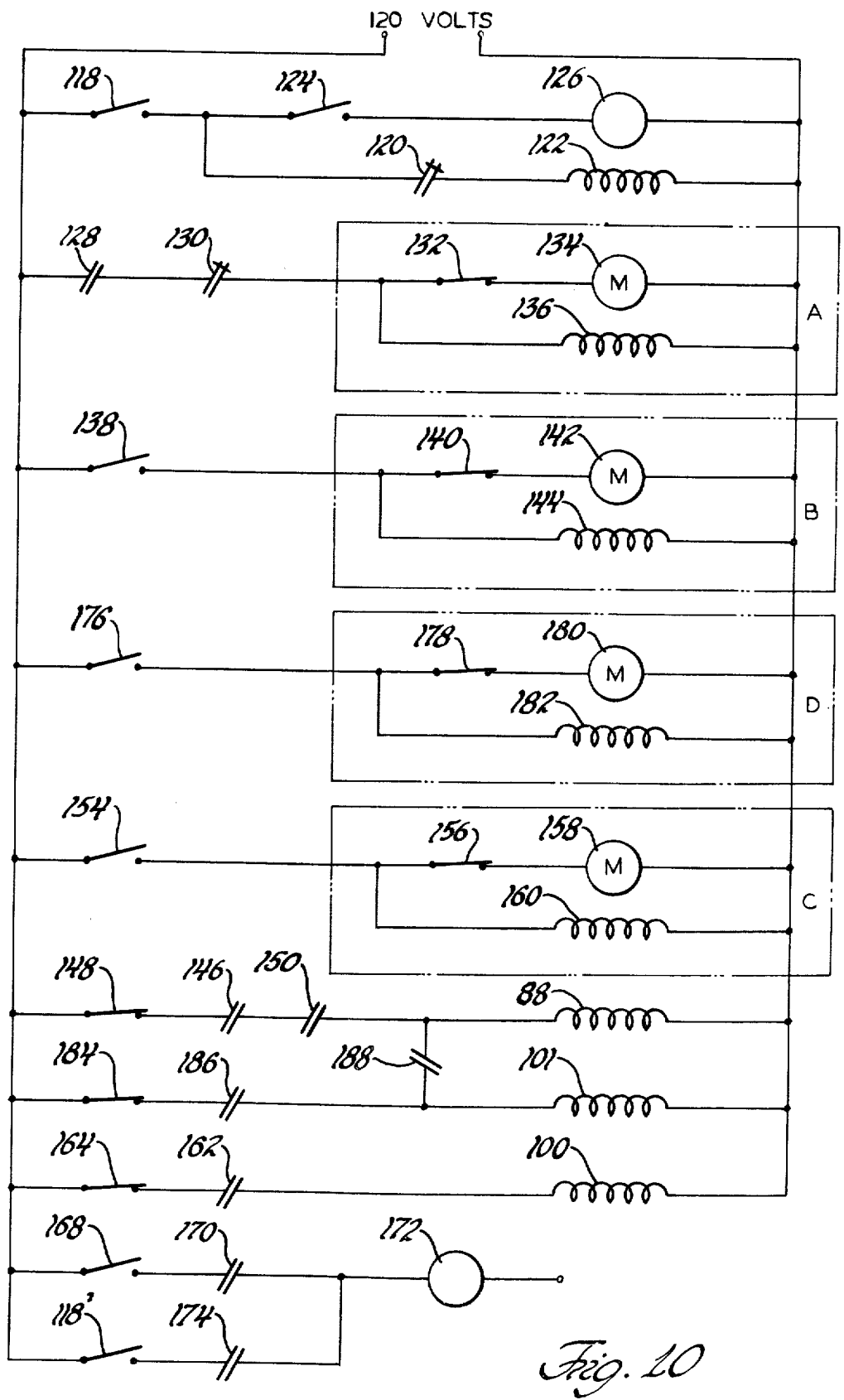
FIG. 10 shows a preferred circuit diagram for the sequential control of a portion of the apparatus of the invention.

When the apparatus is operated so as to introduce the first pressurized gas in first and second stages, the circuitry of FIG. 10 is employed. As can be seen by comparing the circuitry of FIG. 10 with that of FIG. 9, the two circuits are substantially the same except for the fact that the circuitry of FIG. 10 includes an additional timing circuit designated as "D" and a solenoid 101 associated therewith. When the first pressurized gas is introduced in two stages the second control means of the circuit includes not only a first sub-control means comprising timing circuit "B" and associated solenoid 88 but also a second sub-control means comprising timing circuit D and associated solenoid 101. During operation of an apparatus controlled by the circuitry of FIG. 10, when switch 148 is opened, switch 176 in the second sub-control means is closed rather than switch 154 in the third control means. As switch 176 closes, the circuit is completed to timer "D", thus causing motor 180 and clutch 182 to be energized. As the clutch 182 causes the cam array to engage motor 180, contacts 186 and 188 are simultaneously closed. This causes not only solenoid 101 to be energized but also solenoid 88. These solenoids in turn open valve 99 and 97 respectively, thus allowing both the undiluted curing vapor solution and additional inert carrier gas to pass into mixing chamber 92 so as to provide the second stage of the first pressurized gas as discussed above. After a timed interval the cam array of the timer "D" causes switch 184 to open and thus terminates the second stage of the first pressurized gas. Simultaneously with the opening of switch 184, switch 154 is caused to close and the circuit then continues as was the case in FIG. 9. Of course, as is the case with each timer, the motor 180 is shut-off after closing switch 154 but the cam array remains in position.

When the apparatus is operated by the circuits of either FIG. 9 or FIG. 10, as the solenoid 122 is deenergized, the valve which controls the positioning of the machine head 42 by the movement of the machine head supports 44 is closed and the head allowed to lift from engagement with the core box means 24. As the machine head 42 is raised, the switch 124 opens. Thus, the signal to relay coil 126 is discontinued and the relay coil is deenergized. This deenergizing of the relay coil 126 causes contact 128 to change to the open state, thus terminating the signal to the clutch 136 in the timing means "A". The clutch 136 in the timing means "A" is then deenergized, thus disengaging the cam array and allowing it to return to its original position. As the cam array associated with motor 134 in the first control means is disengaged, the switch 138 in the second control means is allowed to open. Also, as the cam array is disengaged, switch 132 in timer "A", which is spring loaded is permitted to close, thus resetting for the next cycle.

As was the case with respect to the first control means, as the switch 138 is opened the signal to the clutch 144 in the timing means "B" is terminated and the clutch deenergized. As the clutch is deenergized, the cam array associated with motor 142 is disengaged and the cams returned to their original position. In the case of the circuitry for single stage first gas operation of the apparatus, switch 154 is caused to open upon disengagement of the cams with motor 142. When the circuit for two stage first gas operation is used, however, the switch 176 is caused to open first, thus causing deenergizing of the cam array associated with motor 180 prior to the opening of switch 154. As was the case with the timer "A", as the clutch disengages, the switches 140 and 178, which are spring loaded, return to a closed position.

As switch 154 opens, the signal to solenoid 160 is terminated and the cam array associated with motor 158 is disengaged. This in turn allows switch 168 to open and reset for the next cycle. Also, spring loaded switch 156 is permitted to reset by closing.

After all switches and contacts have been reset as above, a signal from a portion of the circuitry associated with the apparatus not shown causes the car to begin to move from its position beneath the raised machine head 42. As the car 18 moves out of the position beneath the head 42, the switch 118 and associated switch 118' are opened. This, of course, causes control relay 172 to deenergize and returns contact 174 to the open state. The apparatus is not reset for another gassing cycle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of making a foundry core comprising: mixing a foundry aggregate with a curable binder; shaping the mixture to form a green body in an enclosed mold having venting means therein; introducing a first gas comprising a curing agent under pressure into said body; and immediately thereafter introducing a second gas under pressure into said body such that said venting means is unable to vent said first and second gasses and a back pressure is created causing said gasses, including said curing agent, to be driven throughout said body to uniformly and completely cure said curable binder.

2. A method according to claim 1, wherein said second gas is introduced into said body at a pressure greater than said first gas.

3. A method according to claim 2, wherein the creation of said back pressure causes the pressure of said gasses to be equalized throughout said body.

4. A method according to claim 3, wherein said venting means comprises a plurality of vents through which said gasses are exhausted after the introduction of said second gas has terminated.

5. A method according to claim 4, further including introducing a third pressurized gas comprising an agent adapted to neutralize the residual odor from said curing agent.

6. A method according to claim 5, wherein said agent comprises ozone.

7. A method according to claim 3, wherein said first gas is introduced into said body at a pressure of between about 4 and about 40 pounds per square inch and said second gas is introduced into said body at a pressure of between about 50 and about 100 pounds per square inch.

8. A method according to claim 7, wherein said first gas in introduced into said body in two stages, said gas being introduced during said first stage at a pressure of from about 4 to about 20 pounds per square inch and said gas being introduced during said second stage immediately following said first stage at a pressure of from about 12 to about 40 pounds per square inch.

9. A method according to claim 8, wherein said first gas is introduced during said first stage at a pressure of from about 4 to about 5 pounds per square inch.

10. A method according to claim 8, wherein said first gas comprises a curing vapor solution of a normally liquid agent and an inert carrier gas.

11. A method according to claim 10, wherein said inert carrier gas is selected from the group consisting of carbon dioxide and nitrogen.

12. A method according to claim 10, wherein said first gas is diluted with additional carrier gas prior to said second stage such that said first gas contains a smaller percentage of said curing agent during said second stage than during said first stage.

13. A method according to claim 3, wherein said first gas comprises a curing vapor solution of a normally liquid agent and an inert carrier gas.

14. A method according to claim 13, wherein said inert carrier gas is selected from the group consisting of carbon dioxide and nitrogen.

15. A method according to claim 14, wherein said curing agent is a liquid amine.

16. A method according to claim 13, wherein said first gas is introduced into said body from a continuously available supply.

17. A method according to claim 16, wherein said continuously available supply is stored as a pressurized vapor solution of said liquid agent in said inert carrier gas.

18. A method according to claim 17, wherein said inert carrier gas is selected from the group consisting of carbon dioxide and nitrogen.

19. A method according to claim 18, wherein said curing agent is a liquid amine.

20. A method according to claim 19, wherein said first gas is introduced into said body at a pressure of between about 4 and about 40 pounds per square inch and said second gas is introduced into said body at a pressure of between about 50 and about 100 pounds per square inch.

21. A method according to claim 20, wherein said first gas is introduced into said body in two stages, said gas being introduced during said first stage at a pressure of from about 4 to about 20 pounds per square inch and said gas being introduced during said second stage immediately following said first stage at a pressure of from about 12 to about 40 pounds per square inch.

22. A method according to claim 21, wherein said first gas is introduced during said first stage at a pressure of from about 4 to about 5 pounds per square inch.

23. A method according to claim 21, wherein said first gas is diluted with additional carrier gas prior to said second stage such that said first gas contains a smaller percentage of said curing agent during said second stage than during said first stage.

24. A method according to claim 3, wherein said second gas is introduced into said body for a time interval substantially greater than the time interval for introducing said first gas.

25. A method according to claim 3, wherein said gasses, prior to being introduced into said body, are introduced into a chamber above said body to create zones of said gasses.

26. A method according to claim 25, wherein said enclosed mold contains a plurality of apertures which are located adjacent each of said zones of gasses and through which said gasses are introduced into said body.

27. A method for making a foundry core comprising mixing a foundry aggregate with a curable binder, shaping the mixture to form a green body; providing a ready, continuous supply of a pressurized vapor solution of a liquid curing agent in an inert carrier gas; introducing under pressure a first gas comprising said pressurized staturated vapor solution into said body; and immediately thereafter introducing a second gas under greater pressure into said body while inhibiting the escape of said first gas and said second gas from said body so as to force said first gas throughout said body, thereby uniformly and completely curing said binder.

28. A method according to claim 27, wherein said inert gas is selected from the group consisting of carbon dioxide and nitrogen.

29. A method according to claim 28, wherein said curing agent is a liquid amine.

30. A method according to claim 27, wherein said first gas is introduced into said body at a pressure of between about 4 and about 40 pounds per square inch and said second gas is introduced at a pressure of between about 50 and about 100 pounds per square inch.

31. A method according to claim 30, wherein said first gas is introduced into said body in two stages, said gas being introduced during said first stage at a pressure of from about 4 to about 20 pounds per square inch and said gas being introduced during said second stage immediately following said first stage at a pressure of from about 12 to about 40 pounds per square inch.

32. A method according to claim 3, wherein said first gas is introduced during said first stage at a pressure of from about 4 to about 5 pounds per square inch.

33. A method according to claim 32, wherein said first gas is diluted with additional carrier gas prior to said second stage such that said first gas contains a smaller percentage of said curing agent during said second stage than during said first stage.

34. A method according to claim 30, wherein said second gas is introduced into said body for a time interval substantially greater than the time interval for introducing said first gas.

35. A method according to claim 27, wherein said body is formed in an enclosed mold containing venting means and said gasses are introduced into said body such that said venting means is unable to vent said gasses and a back pressure is created causing said gasses, including said curing agent, to be driven throughout said body to uniformly and completely cure said curable binder.

36. A method according to claim 35, wherein the creation of said back pressure causes the pressure of said gasses to be equalized throughout said body.

37. A method according to claim 36, wherein said venting means comprises a plurality of vents through which said gasses are exhausted after the introduction of said second gas has terminated.

* * * * *